(12) United States Patent
Tempero et al.

(10) Patent No.: US 10,073,899 B2
(45) Date of Patent: Sep. 11, 2018

(54) EFFICIENT STORAGE USING AUTOMATIC DATA TRANSLATION

(71) Applicant: ORACLE INTERNATIONAL CORPORATION, Redwood Shores, CA (US)

(72) Inventors: Russell Tempero, Bozeman, MT (US); Jennifer Pinczes, Bozeman, MT (US); Robert Lyle Wall, Bozeman, MT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 500 days.

(21) Appl. No.: 14/714,743

(22) Filed: May 18, 2015

(65) Prior Publication Data

US 2016/0342645 A1    Nov. 24, 2016

(51) Int. Cl.
*G06F 17/00* (2006.01)
*G06F 17/30* (2006.01)

(52) U.S. Cl.
CPC .............................. *G06F 17/30569* (2013.01)

(58) Field of Classification Search
CPC ............. G06F 17/2854; G06F 17/2735; G06F 17/289; G06F 17/30864; G06F 19/3406
See application file for complete search history.

(56) References Cited

U.S. PATENT DOCUMENTS 7,787,609 B1    8/2010 Flockhart et al.
8,874,636 B2    10/2014 Tuchman et al.
(Continued)

FOREIGN PATENT DOCUMENTS

CN    107873131    5/2016
JP    2002149873    5/2002
(Continued)

OTHER PUBLICATIONS

International Application No. PCT/US2016/031189, Written Opinion dated May 19, 2017, 6 pages.
(Continued)

*Primary Examiner* — Truong Vo
(74) *Attorney, Agent, or Firm* — Kilpatrick Townsend & Stockton LLP

(57) ABSTRACT

Techniques are disclosed for automatic data translation in computing systems. Certain techniques are disclosed herein that enable applications to utilize data in optimal formats specific to each application in an effectively transparent manner, removing the burden to perform data format or type checking, conversions, etc. An automatic data translation module (ADTM) is implemented that automatically translates data as it passes between certain applications. In some embodiments, the ADTM receives a first particular format of data from a first application and automatically/transparently converts the first particular format of data into another representation of the same data, but in a second format utilized by a recipient application. The ADTM may be configured as part of a database application programming interface (API), and can translate textual versions of IP addresses into binary representations for efficient database storage, and translate returned binary representations back into textual representations for convenience and enhanced trace functionalities.

20 Claims, 8 Drawing Sheets

(56) References Cited

U.S. PATENT DOCUMENTS

2007/0106652 A1* 5/2007 Doyle ............... G06F 17/30477
2010/0091967 A1   4/2010 Costello et al.
2013/0227236 A1* 8/2013 Flynn .................... G11C 16/26
                                                    711/165

FOREIGN PATENT DOCUMENTS

| JP | 2003296556 | 10/2003 |
| JP | 2013050951 | 3/2013 |
| WO | 2016195917 | 12/2016 |

OTHER PUBLICATIONS

International Application No. PCT/US2016/031189, International Search Report and Written Opinion dated Jul. 11, 2016, 12 pages.
U.S. Appl. No. 14/724,872, Non-Final Office Action dated Jun. 28, 2016, 10 pages.
European Application No. 16726690.7, Office Action dated Jan. 19, 2018, 5 pages.
Japanese Application No. 2017-546877, Office Action dated Feb. 6, 2018, 6 pages.

* cited by examiner

EFFICIENT STORAGE USING AUTOMATIC DATA TRANSLATION

FIELD

Embodiments of the invention relate to the field of computing systems; and more specifically to methods, apparatuses, and systems providing efficient storage using automatic data translation.

BACKGROUND

Functionality and data for software applications can be provided over a network (e.g., the Internet) by a system of one or more computers. Software as a Service (SaaS), for example, is one way of providing software applications by centrally hosting applications on computing devices that are typically remotely located from the where the applications may be utilized and/or interacted with. Such "on-demand" software is often accessed by users using a web browser or another thin client.

Software applications commonly utilize a variety of data values of a variety of kinds of data formats. One type of a data format is a data type (or simply "type"), which is a classification identifying one of various types of data, such as real, integer or Boolean, and determines the possible values for that type, the operations that can be done on values of that type, the meaning of the data, and the way values of that type can be stored.

Additionally, applications also utilize data in different data formats within a same type. For example, the date "Jan. 2, 2015" may be represented as a string in a variety of formats, including but not limited to "2015-01-02", "01-02-15", "2 Jan. 2015", etc.

Software applications often translate data values between formats (e.g., from a first type to a second type) for performing different actions. For example, an application may convert a particular received value from a first data format (e.g., a string data type) to a second data format (e.g., an integer data type) for comparison or mathematical purposes, but then convert this value to a third data format (e.g., a binary data type) to be used for passing to a library or function requiring arguments in this data type. Accordingly, a number of conversion functions/methods are commonly used by applications, and it is common for applications, over the course of an execution path, to convert one particular value to many different data formats for various purposes.

Some software applications utilize "back-end" databases for data storage, retrieval, and/or analysis. The most widespread kind of database used today is the relational database, which stores data in a set of relational tables that may be reorganized and accessed in a number of different ways. A relational database management system (DBMS) uses relational techniques for storing and retrieving data. Additionally, other kinds of databases are in widespread use such as NoSQL databases, object-oriented databases, object-relational databases, etc.

In database systems, interactions such as accessing, retrieving, and processing typically occur through queries made in accordance with the application program interface (API) protocol supported by the database management system (or "database server"). For example, an application may generate a query to interact with a relational database using Structured Query Language (SQL) statements. SQL statements are used both for interactive queries for data from the database (e.g., inserting data, updating data, selecting data, deleting data, etc.) and for gathering statistics and other data. However, many other kinds of querying techniques are utilized by a variety of database systems.

However, it can be challenging for application developers to generate proper, safe, and efficient queries for interacting with databases. To deal with this abstraction, some applications are architected to utilize database abstraction layers. A database abstraction layer is an application programming interface (API) that unifies the communication between a computer application and one or more underlying databases. Thus, application developers may utilize a consistent, relatively-simple API (e.g., make "simple" function calls) to communicate with underlying databases without having to have expert knowledge of query syntax or any particularities of the actual databases. Further, as new database technologies emerge or query syntaxes change, application developers do not have to adapt to any new interfaces.

BRIEF SUMMARY

The present disclosure relates generally to computing systems; and more specifically, to methods, apparatuses, and systems providing efficient storage using automatic data translation. Certain techniques are disclosed herein that enable multi-application systems to optimally make use of data in optimal formats for each application in a manner that is completely transparent to the applications, and thus can remove the burden from applications in needing to perform many kinds of data format/type checking and conversions. Moreover, certain techniques enable consistent, human-readable application-level logging by eliminating certain data formats/types from being included in these logs.

In some embodiments, an automatic data translation module (ADTM) is implemented that automatically translates data as it passes between certain applications, for example between a human-facing application like a web application and an application-facing application such as a database. In some embodiments, the ADTM receives a first particular format of data from a first application and automatically/transparently converts the first particular format of data into another representation of the same data, but in a second particular format utilized by another application. In some embodiments, this automatic translation occurs in two directions, such that two (or more) applications can communicate in a manner completely agnostic to the data format (e.g., data type) utilization of the other.

According to some embodiments, the ADTM is configured as part of a database application programming interface (API) module serving as an abstraction layer for an application. In some embodiments, the application instructs the database API module to perform queries against a database, and including data of a first format to be used as part of the query. The ADTM of the database API module may then—on the fly—translate the data of the first format into another representation of the data in a second format, and provide the another representation to the database (e.g., as part of a generated query). Similarly, in some embodiments the database API module may receive a result of the query (e.g., a result set including one or more records, or simply a value) including data of the second format, and on the fly translate the data back into the first format to be provided to the application.

Accordingly, in some embodiments an application may utilize Internet Protocol (IP) addresses (possibly exclusively) formatted in a textual representation of the IP address. The application may provide IP addresses in this format to the database API module for querying the database, and the ADTM may translate the textual representation into another data format such as a string representation of a binary version of the IP address, or even a "pure" binary version of the IP address, which is provided to the database. Similarly, the ADTM may operate in a similar manner in the reverse direction, by translating binary (or string representations of binary) versions of IP addresses back into the more human-readable, textual representations of IP addresses. In some embodiments, this translation may include multiple steps, including IP address normalization and one or more data format/type translations.

In some embodiments, the ADTM may be configured to "translate" data received from one application by applying one or more compression and/or encryption algorithms to the data, and thus providing compressed and/or encrypted versions of the data to the second application.

Thus, embodiments allow for the simplification of application development, as the application no longer needs to be concerned with performing multiple, wasteful translations of data into particular formats to interact with one or more other applications (or components). Thus, the resulting application development is simplified, and the application code is streamlined due to the elimination of translation functions, format or type checking statements, etc.

In some embodiments, data may be automatically translated into different formats more optimal for use by the particular involved applications. For example, data may be automatically translated through applying compression or encryption techniques. If such data is provided to a database to be persisted, for example, the database may thus benefit from a reduction of required storage space (in the case of compression) and benefit from a flexible, easy increase in security (in the case of encryption). As another example, data may be translated from a convenient format (e.g., human-readable textual string representations of an IP address, for example) from the perspective of one application into a different convenient type (e.g., binary—which is more efficient from a storage space perspective) from the perspective of a second application. Moreover, in some embodiments where a "convenient" data format is employed by an application utilizing logging, this convenient data format (e.g., easy for humans to read) may be written into the data log in this consistent format, eliminating difficulties for programs and/or humans in deciphering the application logs. Thus, various embodiments can provide substantial computational, speed, security, and/or storage benefits to the functioning of the computing devices employing these disclosed techniques.

The foregoing, together with other features and embodiments will become more apparent upon referring to the following specification, claims, and accompanying drawings.

DETAILED DESCRIPTION

Figure 1:
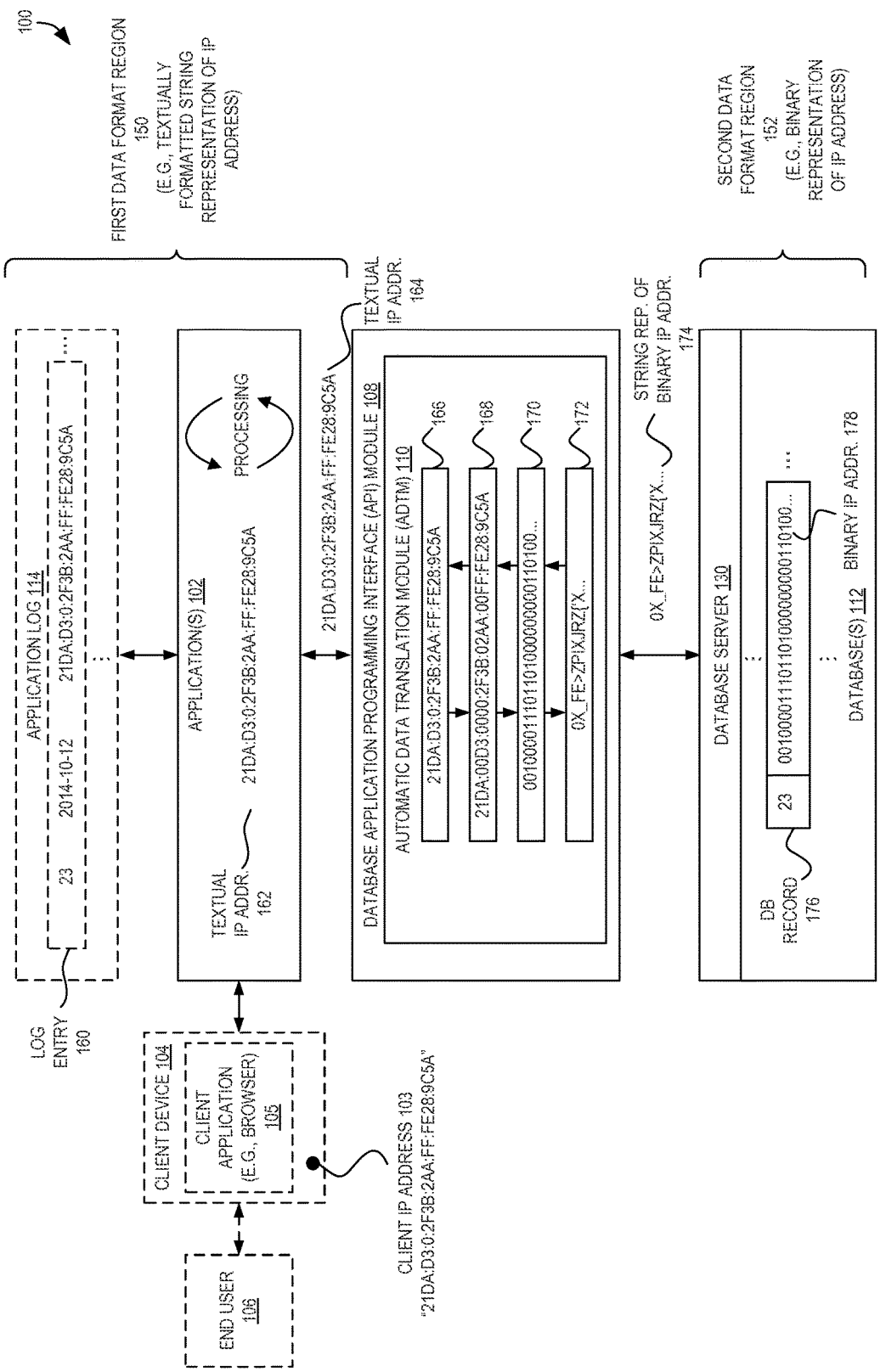
FIG. 1 illustrates a functional overview of a system including an automatic data translation module of a database application programming interface module according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain techniques are disclosed herein that enable multi-application systems to utilize data in optimal formats specific to each application in a manner that can be effectively transparent to the applications, thereby removing the burden from the involved applications in needing to perform data format or type checking, conversions, etc. Moreover, certain techniques enable consistent, human-readable application-level logging by eliminating certain, non-comprehensible data formats from being included in these logs.

In some embodiments, an automatic data translation module (ADTM) is implemented that automatically translates data as it passes between certain applications, for example between a human-facing application like a web application and an application-facing application such as a database. In some embodiments, the ADTM receives a first particular format of data from a first application and automatically/transparently converts the first particular format of data into another representation of the same data, but in a second particular format utilized by another application. In some embodiments, this automatic translation occurs in two directions, such that two (or more) applications can communicate in a manner completely agnostic to the data format utilization of the other.

According to some embodiments, the ADTM is configured as part of a database application programming interface (API) module serving as a database abstraction layer for an application. In some embodiments, the application instructs the database API module to perform queries against a database, and including data of a first format to be used as part of the query. The ADTM of the database API module may then—on the fly—translate the data of the first format into another representation of the data (e.g., in a second format and/or type), and provide this different representation to the database as part of a generated query (or part of an instruction to execute a particular query, such as a prepared statement/stored procedure, for example). Similarly, in some embodiments the database API module may receive a result of the query (e.g., a result set including one or more records, or simply a value) including data of the second format, and on the fly translate the data back into the first format to be provided to the application.

In various embodiments, the ADTM can be flexibly configured to provide benefits for different kinds of interacting applications that may utilize particular formats of data. One such environment includes applications that utilize IP addresses. Although the use of IP addresses is discussed at length herein with respect to various embodiments, this discussion is to be viewed as exemplary and it is expressly stated that other formats of data, translations, etc., are also utilized in some embodiments, which can similarly benefit from the disclosed ADTM and automatic data translation techniques.

In many kinds of applications—such as web-based database applications—IP addresses are often processed for a variety of reasons. For example, it is possible to track Web site customer activity by counting hits to a site from a specific IP address or group of addresses. Also, an application's security subsystem might utilize requestors' IP addresses to validate and permit or reject user access to some or all of an application.

Though by definition an IP address (i.e., an IPv4 address) is a 32-bit integer number, often IP addresses are represented as a textual or character string in the form of "A1.A2.A3.A4" where A1, A2, A3, and A4 are integers from 0 to 255, inclusive, and each integer is separated by a period character. This representation is known as a "dotted-decimal" format, and more formally put is where the 32-bit address is divided along 8-bit boundaries, and each set of 8 bits is converted to its decimal equivalent and separated by periods. Textual representations of IP addresses such as the form "204.56.55.28" are easier for humans to quickly comprehend than when the same value is represented in different formats such as hexadecimal form 0xCC38371C or the binary form 0b11001100001110000011011100011100.

This issue is further magnified with the increased use of IPv6 addresses, which are 128-bit numbers instead of the 32-bit numbers of IPv4 addresses. Some formats for IPv6 addresses are prescribed in IETF RFC 5952 and RFC 4291, etc. For IPv6, the 128-bit address is divided along 16-bit boundaries, and each 16-bit block is converted to a 4-character hexadecimal number and separated by colons. This resulting textual representation is often referred to as "colon-hexadecimal" form. In some instances, colon-hexadecimal IPv6 addresses may be further simplified by removing leading zeros within each 16-bit block. Further, in some instances colon-hexadecimal IPv6 addresses may "compress" contiguous sequences of 16-bit blocks that are each set to 0 by replacing these sequences with a double-colon (::). Accordingly, the size of the textual representation (i.e., colon-hexadecimal format) may significantly vary, despite the fact that the underlying value typically, from a mathematical standpoint, requires only 128 bits.

Turning back to IPv4 addresses, the character string form "A1.A2.A3.A4" is inefficient to use in a query because it is redundant and requires about 15 bytes of storage space, whereas only 4 bytes (i.e., 32 bits) are truly necessary to store an IPv4 address in its binary representation. For example, individually A1, A2, A3, and A4 may each individually be represented with a single 1 byte, while the entire string "A1.A2.A3.A4" will include 7 to 15 characters and thus perhaps 7 to 15 bytes are required, as each character may be stored in 1 byte. An additional issue with storing IP addresses as textual strings is that they often cannot be sorted properly because the data will be sorted as character strings, and not as numbers. Additionally, when IP addresses are stored inefficiently in large databases, this data can require substantial storage space (i.e., waste available storage space) and lead to slow database queries.

IP addresses are often utilized by applications in one of two formats. First, IP addresses may be utilized in a "pure" binary format, in which IP addresses are easily consumable by computers and are represented in a very compact way. However, these representations are very difficult for humans to read and comprehend. In contrast, a second format is a textual or string representation of IP addresses which, on the other hand, is much more consumable for humans but is not as easily consumed by computers. Further, these representations require more storage space to store the same amount of meaning when compared to other formats.

Additionally, as many systems have logging and execution tracing capabilities, human readability of application code and data is tremendously important. On the other hand, the efficient utilization of storage and memory, along with optimal execution speed, is also important. Accordingly, it is a significant problem to efficiently have IP addresses be in the most appropriate format at any given time.

Modern applications could deal with this dichotomy by continually converting back and forth between the representations for different purposes.

For example, an application could make use of various conversion libraries/functions such as using inet_pton( ) to convert IPv4 and IPv6 addresses from text to binary form, and similarly use inet_ntop( ) to convert an address in its standard text presentation form into its numeric binary form.

However, applications must be carefully crafted to always know what representation the data is in at any point to avoid calling these functions improperly. This can result in bugs, processing overhead, and bloated codebases. Additionally, these configurations still suffer from the inability to provide only human-readable textual representations into application logs or traces for debugging, and thus a debugging or monitoring process (or human) may need to perform many conversions itself to determine the details of a particular trace.

Some embodiments, however, incorporate the benefits stemming from the use of different representations by selecting one most beneficial format for use by an application (or set of applications), selecting a different format for use by a different application (or set of applications), and implementing an automatic data translation module there-between. Thus, some embodiments configure an application (and possibly an application log) to utilize textual representations of IP addresses with exclusivity (or near-exclusivity), configure a supporting database to use binary representations of IP addresses (with exclusivity or near-exclusivity), and configure an ADTM to perform translations between the selected representations.

As one example, in some embodiments a system or process (e.g., one or more applications) may primarily or exclusively utilize IP addresses in a textual representation format (e.g., dotted-decimal and/or colon-hexadecimal string representations) throughout the entire life cycle of the system or process, which can prevent the need for conversion to some other format at all entry points into the system. Additionally, this configuration allows process logging and execution tracing to easily display the IP address in a format that is readable by humans. Further, certain other applications or modules (e.g., a validation module or a database server) may be configured to primarily or exclusively use IP addresses in a binary format to increase the efficiency of the processing/storage. Additionally, all involved applications/modules no longer need to be concerned with checking the format/type of the underlying data, reducing often-duplicitous processing and code overhead.

In embodiments employing such configurations where IP addresses are used in a string format during execution, and then converted to binary as needed, developers and maintainers of the system are thus given the ability to debug and troubleshoot that system using human-readable IP addresses (e.g., they are able to easily read and understand IP addresses in execution trace logs). Such configurations also prevent any need to convert IP addresses from a string format, which is the a very common input type in many applications, at all entry points into the system. Furthermore, converting the IP address to a binary format—automatically—for such uses including processing and storage, affords improvements in processing and space efficiency.

FIG. 1 illustrates a functional overview of a system 100 including an automatic data translation module of a database application programming interface module according to some embodiments of the present invention. The entities represented in FIG. 1 may be located at similar or different geographic locations and/or computing environments, and may communicate using one or more communication networks and/or direct inter- or intra-computing device connections.

FIG. 1 depicts one or more applications 102 that are configured to utilize textual representations of IP addresses 162 exclusively or near-exclusively. The applications 102, in some embodiments, include application logging modules that populate application logs 114 with one or more log entries 160, which similarly utilize textual representations of IP addresses 162 exclusively or near-exclusively. Accordingly, the applications 102 and the optional application log 114 present a first region 150 of the overall system 100 that uses a first data format—here, a textually formatted string representation of an IP address, such as dotted-decimal and/or colon-hexadecimal string representations.

The one or more applications 102 may optionally be client-facing, and thus FIG. 1 depicts an optional end user 106 and an associated optional client device 104 of the end user 106, which may execute a client application 105 such as a web browser to interact with the one or more applications 102.

The client device 104, as well as any other computing devices used to implement entities of this system 100, may be of various different types of devices including, but not limited to, personal computers (PCs), desktops, mobile or handheld devices such as laptops, mobile phones, tablets, etc., and other types of devices. Additionally, the client application 105 may be any of many different types of applications, such as a firmware software module of the client device 104, an operating system application (or portion thereof), a user-space application, etc. For example, the client application 105 may be a native application configured to be executed by a particular operating system, a portable application such as a Java-based application, a web browser, an application executed by a web browser, a video game, a word processing or office productivity application, presentation software, etc.

The client device 104 may be assigned (or otherwise utilize) a client IP address 103, here illustrated as "21DA: D3:0:2F3B:2AA:FF:FE28:9C5A". This client IP address 103 may be included in client requests (e.g., HTTP requests) made by the client device to the applications 102, and thus the applications 102 may utilize the client IP address 103 in the textual IP address 162 representation by, as one example, inserting a log entry 160 including the client IP address 103. Here, the log entry 160 is illustrated as including several fields (e.g., an integer value of 23, a date value of 2014-10-12, the textual representation 162 of the client IP address 103, though of course the log entry 160 may include additional or fewer fields of similar or different kinds.

As depicted, the applications 102 may be configured to query a database server 130—using a textual representation of an IP address 164—through a database (DB) application programming interface (API) module 108. The DB API module 108, in some embodiments, includes an automatic data translation module (ADTM) 110 that is configured to translate between data of the first data format (e.g., textual representations of IP addresses 164) used by the application(s) 102 and data of the second data format (e.g., binary representations of IP addresses, or string representations of binary representations of IP addresses 174) used by the database server 130.

For example, in some embodiments the ADTM 110 receives a copy 166 of the textual representation of the IP address 164, and translates it through a series of transformations. One transformation is illustrated between block 166 and 168, in which the copy 166 is expanded (e.g., de-compressed) it into a "full" colon-hexadecimal textual representation 168 comprising eight 4-character hexadecimal values separated by colons. For example, the second piece ("D3") of the received copy 166 is expanded by zero-filling to result in a corresponding "00D3" value, and similarly the third piece ("0") of the received copy 166 may also be expanded by zero-filling to result in a corresponding "0000" value. Of course, in some embodiments including double-colons, these double-colons may be expanded with corresponding pieces of colon-separated "0000" values.

Then, in the depicted embodiment, the full textual representation 168 is converted by the ADTM 110 into a "pure" binary representation 170 thereof. In some embodiments, this comprises translating each hexadecimal character into its corresponding binary equivalent of bit values. In some embodiments, the "pure" binary representation 170 may be stored in a variable of binary type, but in some embodiments this binary representation may be stored in a variable of a different type—e.g., a string.

In some embodiments, the binary representation 170 is then provided to the database server 130, and the automatic data translation is complete from the perspective of the ADTM 110.

In other embodiments, such as the one illustrated in FIG. 1, the binary representation 170 may be further transformed by the ADTM 110 into another data format—a string representation 172 of the binary representation. As illustrated, the string representation 172 of the binary representation may include a variety of alphanumeric characters and/or non-alphanumeric characters, which might include "non-printable" characters. In some embodiments, a string representation 172 of the binary representation may be used within a constructed query (e.g., constructed by the DB API module 108) that is sent to the database server 130 for processing, and is represented herein as the string representation of the binary representation of the IP address 174 sent between the DB API module 108 and database server 130. This space—i.e., the communications between the DB API module 108 and the database server 130—may be referred to as a third data format region, though in some embodiments where the pure binary representation 170 is communicated between the two, this space may be deemed part of the second data format region 152.

The database server 130 may be communicatively coupled with one or more databases 112, which include database records 176 that may be persisted (e.g., on a disk or flash storage device) and/or maintained in a memory (e.g., RAM) using volatile or non-volatile techniques. Although FIG. 1 and other description herein is made with respect to a database server 130 and database 112 being separate entities, in some embodiments these entities are "merged" into one functional unit, which may be referred to as just a "database" or "database server."

In FIG. 1, upon receipt of the string representation of the binary representation of the IP address 174, the database server 130 may query the database 112 to search for data (e.g., retrieve database record 176), perform computations based upon data, insert or update or delete data (e.g., database record 176), etc. In the depicted embodiment of FIG. 1, it may be the case that the application 102 is persisting a record (i.e., performing an insert or update within a database table or store) that is to include the client IP address 103. In some embodiments, the database server 130 translates the received string representation of the binary representation of the IP address 174 into a "pure" binary representation (e.g., binary representation 170) and stores it in the database record 176 as a binary value.

Of course, in some embodiments the above process also occurs in the opposite direction—i.e., from the database server 130 back toward the application(s) 102. For example, the database server 130 may generate a result set (i.e., data from or based upon database records stored by database(s) 112) in response to a query. This result set may include one or more values of an attribute that are of a particular format (e.g., a binary value, or a string representation of a binary value, etc.). The result set is provided back to the DB API module 108, which utilizes the ADTM 110 to perform operations similar to those illustrated in blocks 172 to 170 to 168 to 166 to automatically translate the one or more values of the result set back into the format utilized by the applications 102—here, textual representations of IP addresses 164.

In addition to supporting different formats and types for IP addresses, in some embodiments the ADTM 110 may also be configured to perform automatic translation between additional formats for additional data.

For example, some embodiments are configured to automatically translate data by executing one or more lossless compression algorithms that allow the original data to be perfectly reconstructed from the compressed data. Accordingly, in some embodiments, one or more applications 102 may only utilize uncompressed data which, when passed through the ADTM 110, gets automatically compressed before being passed to other applications/modules (e.g., database server 130). Similarly, compressed data provided by the "other" applications/modules may be uncompressed as it passes through the ADTM 110 before being provided back to the applications 102. The lossless compression algorithms may include general-purpose algorithms such as run-length encoding or the Lempel-Ziv-Markov chain algorithm, audio-compression algorithms such as the Free Lossless Audio Codec (FLAC) algorithm, graphics algorithms such as the lossless Portable Network Graphics (PNG) algorithm, etc. In some embodiments, lossy algorithms may also be applied, and may be used in scenarios where translated data does not need to be perfectly re-constructed.

Similarly, some embodiments are configured to automatically translate data by executing one or more encryption algorithms to thereby translate plaintext into ciphertext. Some embodiments performing such encryption translation are particularly useful when sensitive data needs to be provided to an untrusted party, such as when private information is to be stored in a "public" or otherwise insecure location in a cloud or multi-tenant environment. Accordingly, in some embodiments the ADTM 110 employs symmetric key techniques to encrypt/decrypt data, and may utilize (and/or generate) keys specific to each particular module/application 102, or utilize one key (specific to the ADTM 110 itself) for multiple such modules/applications 102.

Figure 2:
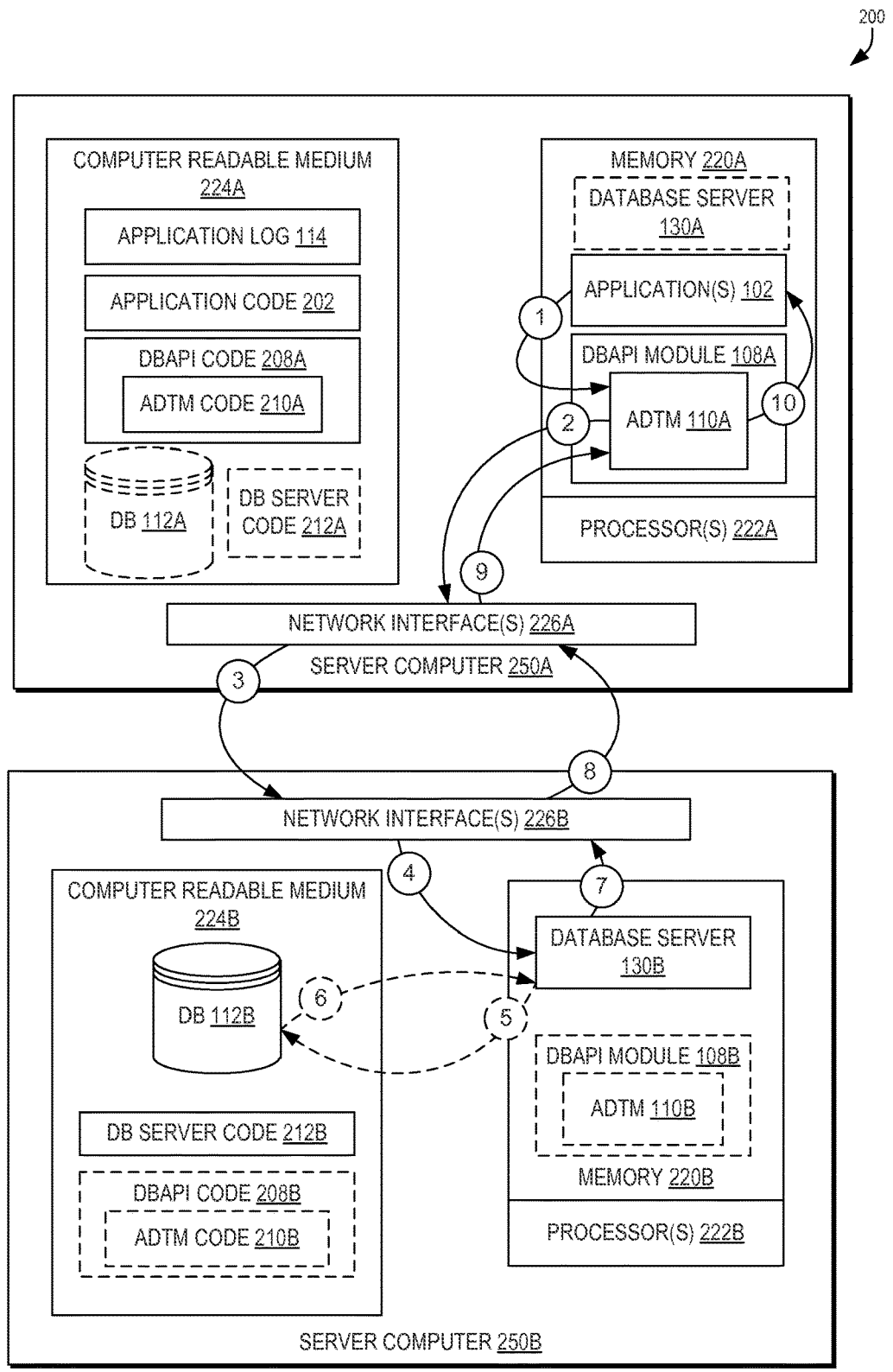
FIG. 2 illustrates a simplified block diagram depicting exemplary hardware configurations of a system including an automatic data translation module according to some embodiments of the present invention.

Having now provided a high level overview of some aspects of the system 100, we now turn to some illustrative hardware environments for providing automatic data translation functionalities. FIG. 2 illustrates a simplified block diagram depicting exemplary hardware configurations of a system including an ADTM according to some embodiments of the present invention.

In this illustration, the system 200 includes two server computers 250A and 250B, though in other embodiments the system 200 may include just one server computer or more than two server computers. The servers 250 may include one or more physical network interfaces 226A-226B to communicatively couple the servers 250 with other computing devices (e.g., client device 104, etc.) across one or more communication networks. The one or more communication networks can include networks of various types, each possibly including one or more networking devices or equipment including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

One configuration utilized in some embodiments is represented using solid bordered entities. In this configuration, server computer 250A executes one or more applications 102 in memory 220A and a DB API module 108A including an ADTM 110A. The server computer 250A may, in some embodiments, store code for the applications (i.e., application code 202) and DB API code 208A on a computer-readable medium, portions of which are brought into memory 220A during execution by one or more processors 222A. In some embodiments, the server computer 250A further stores an application log 114 on the computer readable medium 224A, and of course this log 114 may also be stored within memory 220A.

In this configuration, the applications 102 and DB API module 108A are executed at one server computer 250A, and the database server 130B (along with database 112B) are provided at another server computer 250B.

Thus, at circle '1' the applications 102 may attempt to query the database 112B using a first data element of a first data format by calling the DB API module 108A. In some embodiments, this comprises a function or method call into a library. The ADTM 110A then, upon analyzing the first data element, may determine that it is to automatically translate the first data element into a second data element of a second data format for inclusion in the query. The ADTM 110A may perform this using a pre-defined binding, which indicates the format/type of the input data element and maps this format/type to another format/type (i.e., the second data format) to be used by database server 130B. The pre-defined binding may be provided through a configuration of the applications 102, such as by defining the binding using a shared variable or memory region, providing a static or run-time configuration to the DB API module 108A, or even by indicating the binding within the query at circle '1'.

After performing the automatic translation (by the ADTM 110A) and generating the appropriate query (by the DB API module 108A, which includes the automatically translated data), the DB API module 108A causes, at circle '2', the network interfaces 226A to transmit a request to execute the query, at circle '3', which is received by the network interfaces 226B of the second server computer 250B. This request, at circle '4', is provided to the database server 130B, which executes the query. This may involve retrieving data, at circles '5' and '6', from a persisted database 112B stored by a computer readable medium 224B, though in some embodiments the database 112B instead is queried just within the memory 220B of the server computer 250B. Upon generating a result set in response to the query, the database server 130B may then cause, at circle '7', the network interfaces 226B to transmit a message at circle '8' back to server computer 250A, where the message is received at network interfaces 226A. At circle '9', the message is provided back to the DB API module 108A, where any necessary included data is identified and translated by the ADTM 110A, and the result set is then returned from the DB API module 108A back to the originating application(s) 102 at circle '10'.

FIG. 2 also illustrates, with regard to entities represented with dashed lines, alternate configurations. In some embodiments, the database server 130A may reside in the same memory 220A at the first server computer 250A as the applications 102 and/or ADTM 110A, and similarly a database 112A and/or database server code 212A may also exist within the computer readable medium 224A of the server computer 250A. Thus, the operations depicted within circles '1' to '10' may occur within a server computer 250A— perhaps using function/method/library calls, inter-process communication, etc.—without use of the network interfaces 226A.

Of course, in other embodiments the database 112B may exist at a separate computer (e.g., server computer 250B) than the database server 130A, which could be at server computer 250A or a completely separate server computer (e.g., non-illustrated server computer 250C).

An additional configuration includes the DB API module 108B (including ADTM 110B) executing in memory 220B by processors 222B at the same server computer 250B as one or both of the database server 130B and database 112B. In some such configurations, the DB API code 208B and ADTM code 210B may be persisted using the computer readable medium 224B. Accordingly, the applications 102 may execute at a separate server computer 250A than the DB API module 108B, which may execute at a same server computer 250B as the database server 130B and/or database 112B, or one or both of these elements may be located at another server computer.

Figure 3:
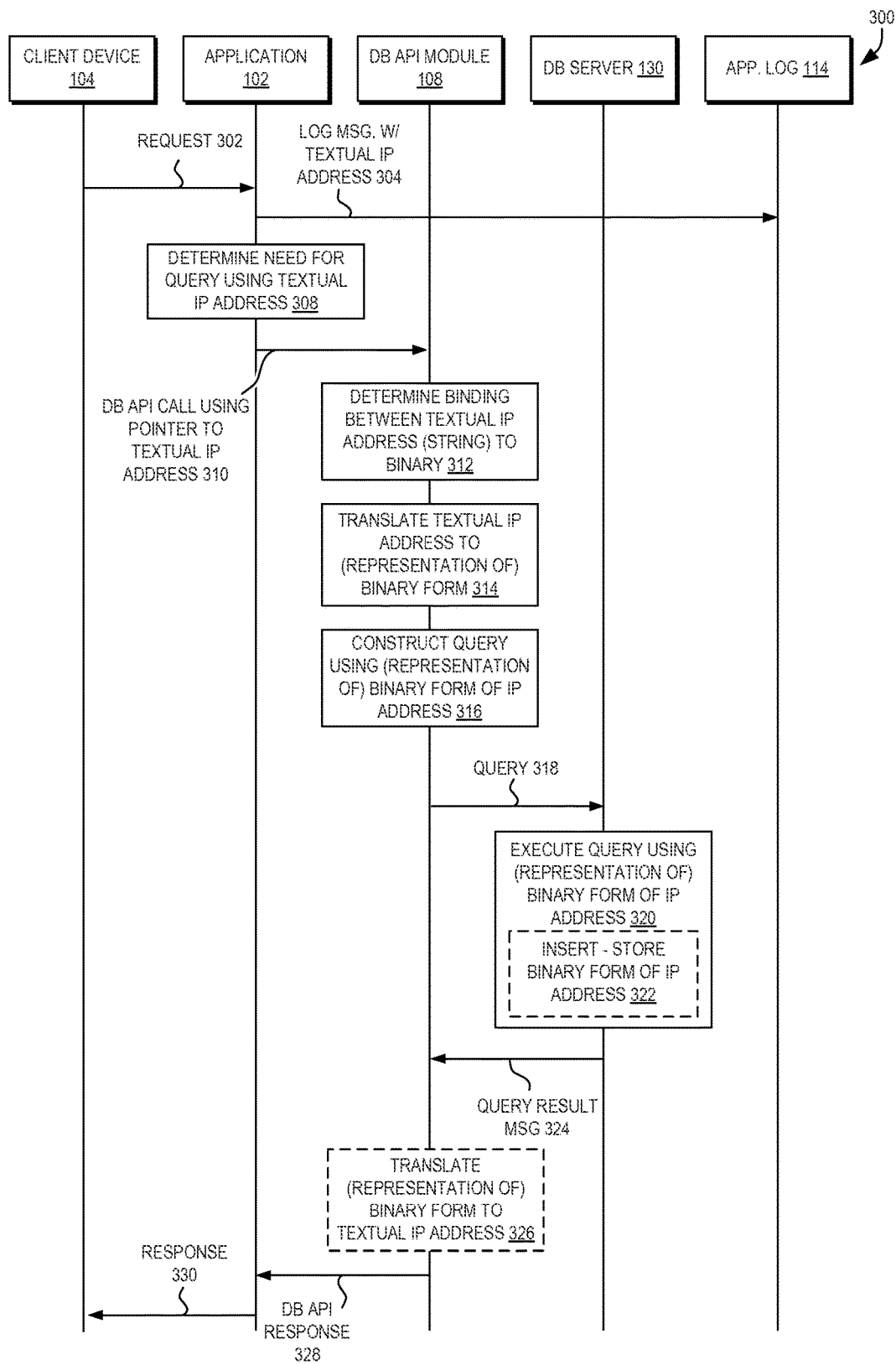
FIG. 3 illustrates a sequence diagram depicting automatic data translation operations performed as part of a database query resulting from a client request according to some embodiments of the present invention.

Of course, the system 200 depicted in FIG. 2 merely provides a few examples and is not intended to unduly limit the claimed embodiments of the present invention. Thus, one of ordinary skill in the art would recognize many possible variations, alternatives, and modifications to this illustrated system 200. Having discussed some potential hardware implementations for an automatic data translation system 200, we now turn to FIG. 3, which provides a sequence diagram depicting automatic data translation operations performed as part of a database query resulting from a client request according to some embodiments of the present invention.

The depicted sequence diagram 300 includes a client device 104, an application 102, an DB API module 108 (including the ADTM 110), a database server 130, and an application log 114.

Initially, the client device transmits a request 302 to the application 102. This transmission may occur responsive to a user selecting a link or other user interface element within an application executing at the client device 104. For example, in some embodiments the client device 104 executes a portion of a web application via a browser, and upon the user interacting with the web application (e.g., by clicking or otherwise selecting a user interface element such as a link or graphic in the web application), the client device 104 transmits the request 302. In some embodiments, the request 302 comprises a Hypertext Transfer Protocol (HTTP) request for a resource associated with the application 102, though in other embodiments the request 302 may be another type of request. In some embodiments, the request 302 includes a client IP address assigned to (or utilized by) the client device 104.

Upon receipt of the request 302, the application 102 may cause a log message 304 including a textual representation of the client IP address to be added to the application log 114. This may occur in a variety of places within this sequence diagram for any of a multitude of reasons, such as logging receipt of the request 302, logging a creation or issuance of a query, logging a receipt of a query response, transmitting a response 330 to the client device 104, etc. However, this logging 304 is depicted herein only once for the sake of clarity to avoid obscuring other aspects. In some embodiments, only textual representations of IP addresses will be stored in the application log 114, thus simplifying later debugging, troubleshooting, and/or monitoring efforts.

At block 308, the application determines a need to perform a query using the textual IP address associated with the client device 104. For example, in some embodiments the request 302 may be a request for a particular web page provided by the application 102, and the query may involve seeking data associated with the IP address, updating a record of received requests associated with that particular IP address, etc.

The application 102 then issues a call 310 to the DB API module 108, which includes a pointer to a variable storing the textual IP address. In some embodiments, the textual representation of the IP address may be provided (or made available) to the DB API module 108 in other ways known to those of skill in the art, including but not limited to sending a message including the textual representation of the IP address, placing the textual representation of the IP address in a shared memory region, etc.

In some embodiments, the query 318 may be agnostic to the type of querying performed (SQL or otherwise) or type of database used, and thus may indicate a desire to generically search for a particular element, for example.

The DB API module 108 executes the ADTM 110 (not pictured herein), which at block 312 determines a binding between the inputted textual representation of the IP address (as a string data type) and the outputted format, which may be a binary data type, or a string representation of a binary representation of the IP address. This binding determination may occur in a variety of ways, including but not limited to identifying a binding definition made by the application 102 in ADTM-accessible memory, identifying the binding using an explicit declaration from within the API call 310, identifying a pre-configured association made for the application and the particular data element (i.e., an IP address), etc.

For example, in some embodiments a particular attribute/column stored in a database or returned in a result set (having a second data format/type) may be bound to a particular variable of the code of the application (having a first data format/type). In such embodiments, determining the binding includes associating the variable of the code (e.g., having the first data format) with the attribute/column of an underlying database or result set (having the second data format). Thus, the determining of the binding may identify the need to perform automatic data translation, such as when the bound application variable comprises a string and the bound returned attribute comprises a binary value.

With this determined binding, the ADTM 110 then, at block 314, translates the textual representation of the IP address into the associated binary representation of the IP address (or string representation thereof, for example).

At block 316, then, the DB API module 108 constructs a query using the translated data from block 314. In some embodiments, the DB API call 310 specifies (or is associated with) a type of query to be made, such as a SQL INSERT query, SELECT query, UPDATE query, DELETE query, etc. Thus, in various embodiments the querying need not be SQL, but instead may utilize other querying methodologies associated with different types of databases/data stores.

The DB API module 108, having constructed the query at block 316, sends the query 318 to the database server 130, where the query is executed 320. In some embodiments, this query may include the binary representation of the IP address, and the database server 130 may perhaps directly use this binary representation in configurations where the database server 130 already stores binary representations of IP addresses. In some embodiments, though, the query 318 may include a string representation of the binary representation of the IP address, and thus the database server 130 may itself need to convert this string representation into a "pure" binary representation (assuming that it stores binary versions of IP addresses).

As one example, the query 318 may comprise a command to insert a record into the database, and by executing the query 320, the database server 130 will insert the record including a binary representation of the IP address.

After executing 320 the query, the database server 130 transmits a query result message 324. Depending upon the type of query 318, the query result message 324 may include different data, such as a result set of database records (or portions thereof, or derivatives thereof, etc.) matching a search (e.g., SELECT) query, or an indicator of whether a query succeeded or failed.

In embodiments where a result set is returned that includes data of the second data format (i.e., a binary representation of an IP address, or a string representation of a binary representation of an IP address), the DB API module 108—using the ADTM 110—may similarly translate the second data format back into a first data format (e.g., textual representation of the IP address) for use by the application 102, and thus replace the instances of the second data format with corresponding instances of the first data format within the result set.

This query result, possibly including a modified result set (with translated data), is returned as part of DB API response 328 to the application 102, which may use this data—of the first data format—to construct and send the appropriate response message 330 (e.g., an HTTP response) to the client device 104.

Thus, the system is configured such that the application 102 primarily only utilizes IP addresses in the first data format (i.e., a textual representation such as colon-hexadecimal or dotted-decimal), and the database server 130 primarily only utilizes IP addresses in the second data format (i.e., binary, or string representation of binary).

We now turn to an exemplary flow in accord with some embodiments. The operations of this flow is described with reference to the exemplary embodiments of the other diagrams. However, it should be understood that the operations of this flow diagram can be performed by embodiments of the invention other than those discussed with reference to these other diagrams, and the embodiments of the invention discussed with reference these other diagrams can perform operations different than those discussed with reference to the flow diagram. Also, though the flow diagram in this figure shows a particular order of operations performed by certain embodiments of the invention, it should be understood that such order is exemplary (e.g., alternative embodiments may perform the operations in a different order, combine certain operations, overlap certain operations, etc.).

Figure 4:
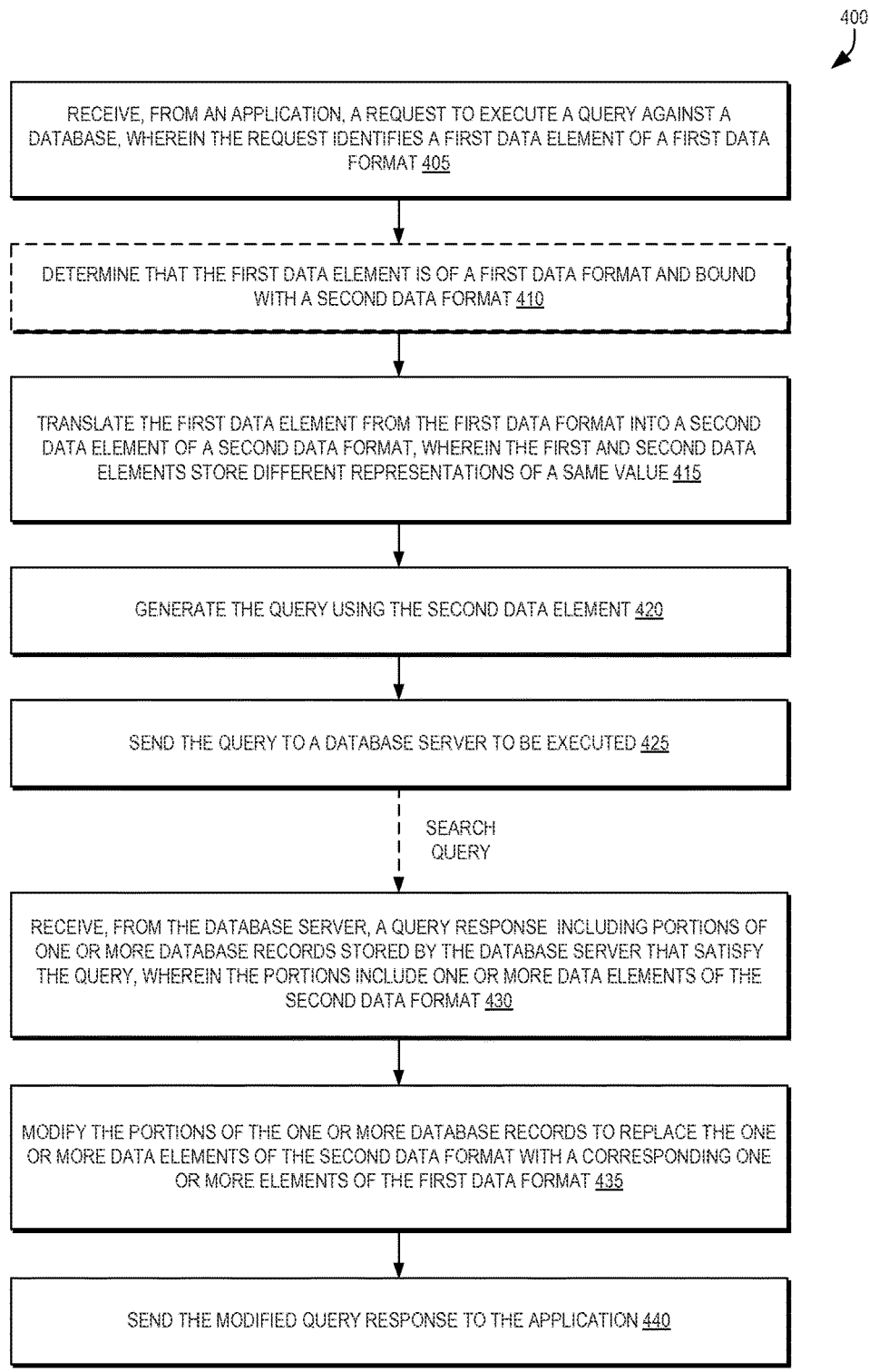
FIG. 4 illustrates a flow for performing an automatic data translation operations according to some embodiments of the present invention.

FIG. 4 illustrates a flow 400 for performing an automatic data translation operations according to some embodiments of the present invention. In some embodiments, the flow of FIG. 4 may be performed by the database API module 108 of FIG. 1, FIG. 2, and FIG. 3. This flow 400 presents operations that are agnostic to particular data formats, though a data format-specific flow is presented later herein with regard to FIG. 5.

The flow 400 includes, at block 405, receiving, from an application, a request to execute a query against a database. The request identifies a first data element of a first format. In some embodiments, the request comprises a function or method call to a DB API module where the first data element may be provided as an argument. Although the request may occur entirely within one particular server computer (e.g., from an application to a DB API module or ADTM, each of which may be executed by a particular server computer), in some embodiments the request is transmitted across a network from one server computer (e.g., executing an application) to another server computer (e.g., executing a DB API module or just a ADTM).

In some embodiments, the flow 400 includes block 410, in which it is determined that the first data element is of a first data format and bound to a column/attribute of a database or result set that is of a second data format. In some embodiments, this determination includes identifying a stipulated type for the first data element, which may be identified within the request or via another data structure made available to the DB API module/ADTM.

The flow 400 includes, at block 415, translating the first data element from the first data format into a second data element of a second data format. The first and second data elements store different representations (i.e., different formats) of a same value 415. Thus, both data elements may be a same data type (e.g., string) but have different formats.

For example, a first data element may comprise a string including four characters "0110" and the second data element may comprise a string storing just "6". Both of which, depending upon context, could represent the decimal number 6.

As another example, both data elements could be different data types. The first data element may be of a string data type and store a textual representation of an IPv6 address including hexadecimal characters and colon characters, and the second data element may be of a binary data type and store a different representation (i.e., 0s and 1s) of the very same IPv6 address.

Thus, block 415 includes translating the first data element from the first format into the second format, which may or may not include changing data types. The translating may include performing a set of individual data transformations, performing an encryption algorithm, performing a compression algorithm, etc.

At block 420, the flow 400 includes generating the query using the second data element. For example, block 420 may include, for a request seeking an addition of a record to a data store, generating a SQL "INSERT . . . " statement including a value for an attribute that is the second data element (generated from the block 415 translation). As another example, block 420 may include, for a request seeking a retrieval from a data store, generating a SQL "SELECT . . . " statement including the second data element.

The flow 400 includes, at block 425, sending the query to a database server to be executed. In some embodiments, this includes transmitting the query over a network to a remote database server, but in some embodiments the database server may operate at a same server computer as the DB API module/ADTM. Of course, in some embodiments the "database server" need not be a traditional, relational database management system, but may include other components that provide access to data.

As illustrated between blocks 425 and 430, we now continue the flow 400 under the assumption that the query is a "search" (e.g., SELECT) query, though some or all of these operations may be performed for other types of queries, too.

The flow 400 includes, at block 430, receiving, from the database server, a query response including portions of one or more database records stored by the database server that satisfy the query. The portions include one or more data elements of the second data format.

For example, the query response may include a result set including one or more "rows" (or "records"), and each row may include a datum of a field (or value) of the second data format.

In the alternative, the query response may not include direct portions of database records, but could be based upon portions of database records. As one example, a query response may include a result set including a "derived" or "calculated" column of the second data format, which may be based upon data from a database but not be explicitly stored in the database.

The flow 400 includes, at block 435, modifying the portions of the one or more database records to replace the one or more data elements of the second data format with a corresponding one or more elements of the first data format 435. This block 435 may include performing similar operations as discussed with regard to block 415, though likely in a reverse or inverse manner, to translate the data of the second data format into data of the first data format.

Then, at block 440 the flow 400 includes sending the modified query response to the application. Accordingly, the application both provides (to the database server, see block 405) data of the first data format and receives back data (from the database server, see block 440) of the first data format, and does not need to be concerned with or aware of the use of the second data format by the database server. Similarly, the database server may both receive (in the query, see block 425) data of the second data format, and send back (in the query response, see block 430) data of the second data format, and thus does not need to be concerned with or aware of the use of the first data format by the application(s).

Figure 5:
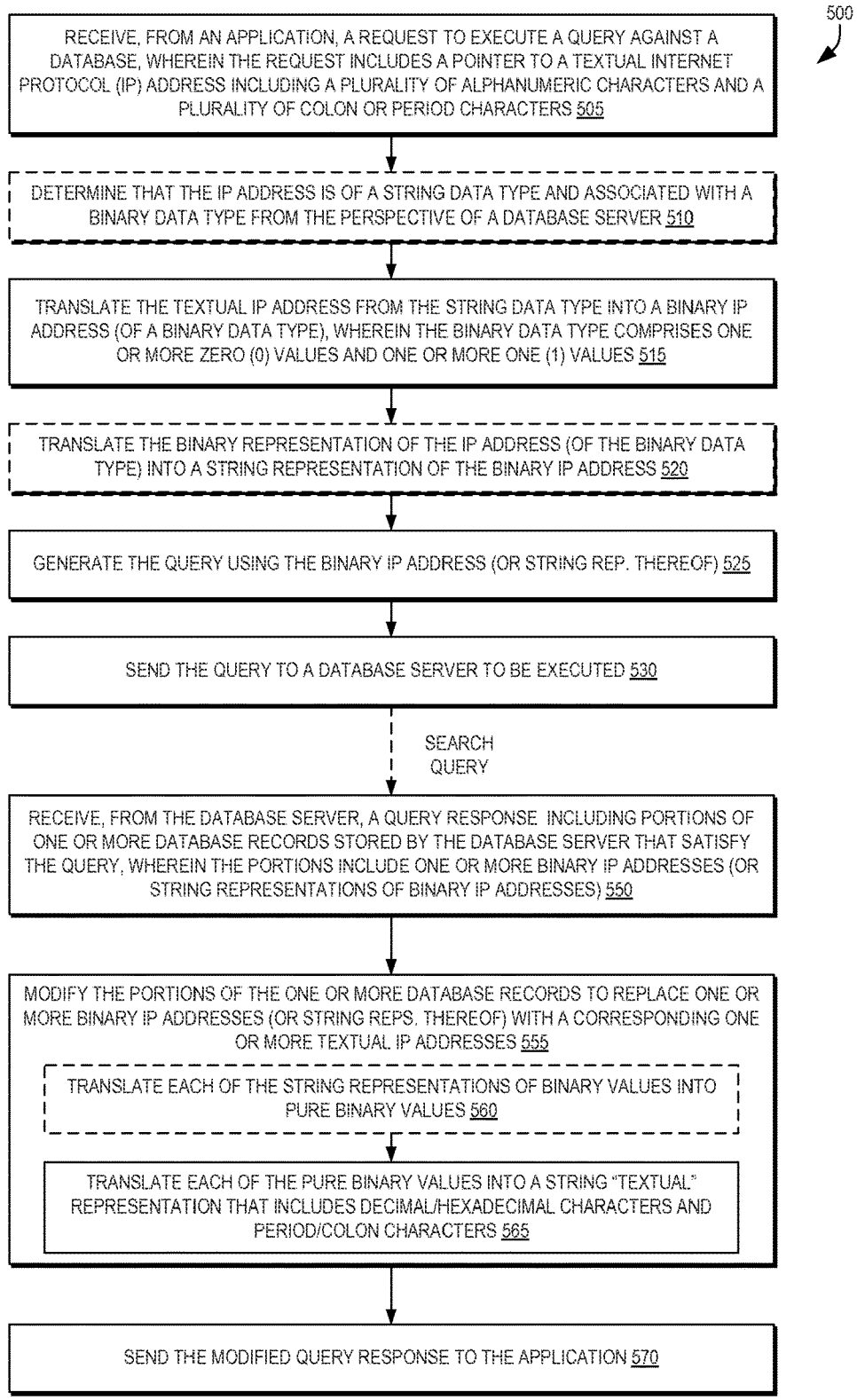
FIG. 5 illustrates an exemplary flow for performing an automatic data translation operations involving Internet Protocol addresses according to some embodiments of the present invention.

We now turn to FIG. 5, which provides a more specific flow in a particular exemplary embodiment including operations similar to those of FIG. 4. In particular, FIG. 5 illustrates an exemplary flow for performing an automatic data translation operations involving Internet Protocol addresses according to some embodiments of the present invention. In some embodiments, the flow of FIG. 5 may be performed by the database API module 108 of FIG. 1, FIG. 2, and FIG. 3.

The flow 500 includes, at block 505, receiving, from an application, a request to execute a query against a database. The request includes a pointer to (e.g., a reference to) a textual Internet Protocol (IP) address including a plurality of alphanumeric characters and a plurality of colon or period characters. Of course, in some embodiments the request includes a copy of the textual IP address instead of a pointer.

The flow 500 includes, at block 510, determining that the IP address is of a string data type and associated with a binary data type from the perspective of the database server providing access to the database. For example, block 510 may include determining that the IP address comprises a textual representation of the IP address including numeric or hexadecimal characters and periods or colons, and determining that the IP address is bound to (or associated with) a field to be returned by the query in a result set (or a field existing within the database) of a different data format—such as binary.

Then, at block 515 the flow 500 includes, translating the textual representation of the IP address from the string data type into a binary IP address of the binary data type. Thus, the textual representation (e.g., colon-hexadecimal notation, dotted-decimal notation) of the IP address is converted into a binary representation, comprising one or more zero (0) values and one or more one (1) values. In some embodiments the binary representation is at least briefly stored in a binary data type, although in other embodiments the binary representation may be stored within a string data type (as a set of '0' and '1' ASCII characters, for example, instead of bits). One example of this translation is represented in FIG. 1 by blocks 168 and 170.

Optionally, at block 520 the flow 500 includes translating the binary representation of the IP address of the binary data type into a string representation of the binary IP address. In some embodiments, this includes modifying groupings of 0 and/or 1 values (e.g., eight-bit groupings, sixteen-bit groupings, thirty-two bit groupings, etc.) into a set of characters of a string according to a character-encoding scheme, such as American Standard Code for Information Interchange (ASCII), Universal Character Set+Transformation Format—8-bit (UTF-8), UTF-16, UTF-32, and the like. This block 520 may be particularly useful for a database server that communicates using instructions/commands that are strings, for example, and may not be particularly useful for a database server that is able to directly communicate using other data types such as binary.

The flow 500 includes, at block 525, generating the query using the binary IP address (from block 515) or string representation thereof (from optional block 520). This may include generating a SQL statement or other query or statement of a data manipulation language, but in some embodiments may include generating an instruction to execute a particular predefined query (e.g., a prepared statement or stored procedure), where the instruction includes the binary IP address or string representation thereof as an argument or input value for the query. At block 530, the query (or instruction to execute the query) is sent to the database server to be executed.

The flow 500 includes, at block 405, receiving, from the database server, a query response including portions of one or more database records stored by the database server that satisfy the query. The portions include one or more binary IP addresses (or string representations of binary IP addresses, such as when the database server communicates using data of the string data type).

At block 555, the flow 500 further includes modifying the portions of the one or more database records to replace one or more binary IP addresses (or string representations thereof) with a corresponding one or more textual IP addresses utilized by the application. In some embodiments, block 55 includes performing similar operations as presented with regard to blocks 515 and/or 520, either in an inverse manner or perhaps in a same ordering, depending upon the particular embodiment and involved data formats.

Accordingly, in some embodiments, block 555 includes translating 560 each of the string representations of the binary values into "pure" binary values, and translating 565 each of the pure binary values into a string "textual" representation including decimal or hexadecimal characters and period or colon characters.

Then, at block 570 the flow 500 includes sending the modified query response to the application, which thereby is insulated from checking the returned format of data, translating the data, etc.

Figure 6:
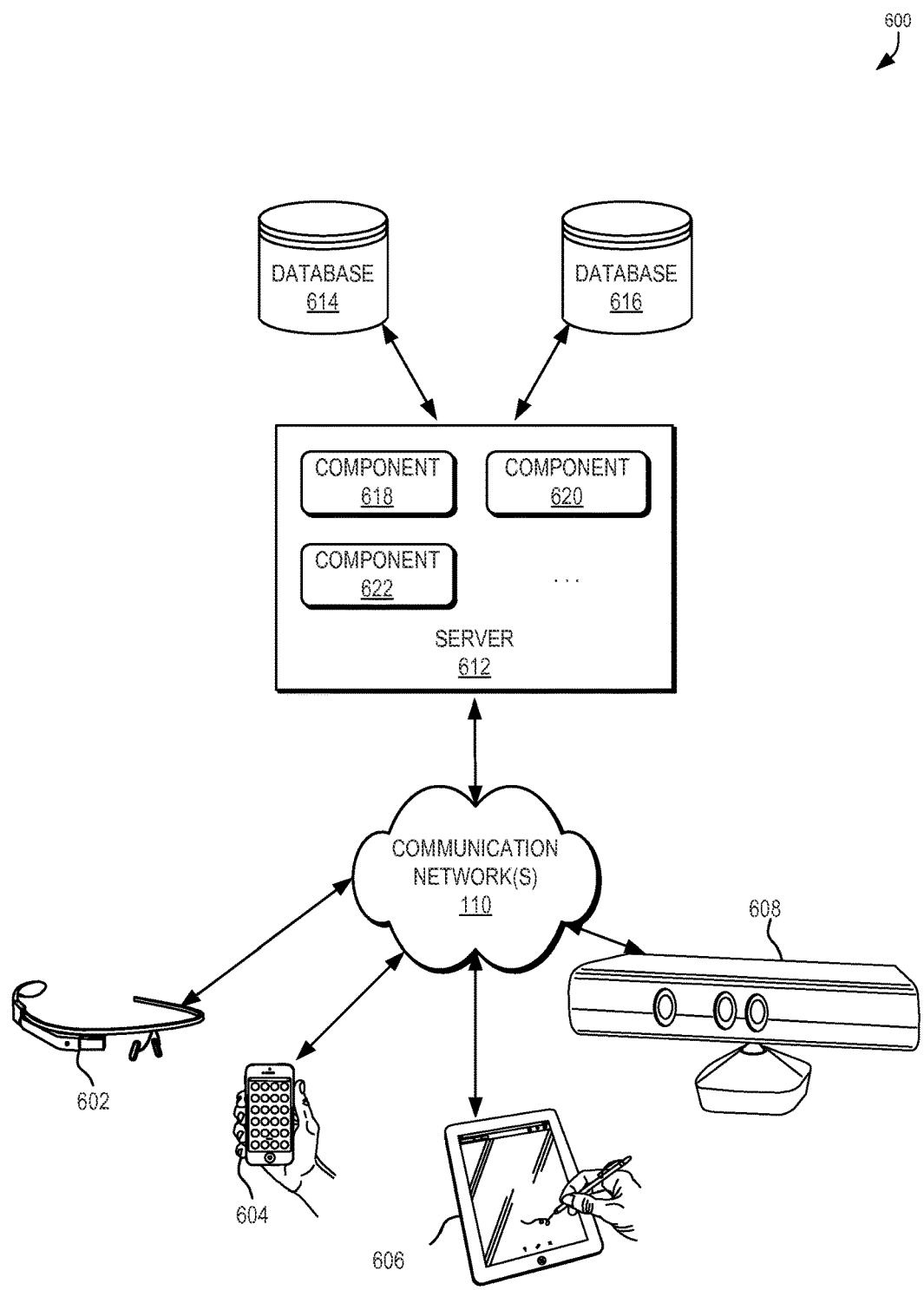
FIG. 6 illustrates a simplified diagram of a distributed system for implementing some embodiments of the present invention.

FIG. 6 illustrates a simplified diagram of a distributed system for implementing some embodiments of the present invention. In the illustrated embodiment, distributed system 600 includes one or more client computing devices 602, 604, 606, and 608 (e.g., examples of client device 104), which are configured to execute and operate a client application (e.g., application 105) such as a web browser, proprietary client (e.g., Oracle Forms), or the like over one or more network(s) 110. Server 612 may be communicatively coupled with remote client computing devices 602, 604, 606, and 608 via network 110, and may operate as server computer 250A and/or server computer 250B, etc.

In various embodiments, server 612 may be adapted to run one or more services or software applications such as services and applications that provide code and/or data for performing automatic data translation for applications executing at the server 612 or another server. In certain embodiments, server 612 may also provide other services or software applications that can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. As one example, one or more of the components (e.g., software component 618) may be the DB API module 108 and/or ADTM 110 discussed throughout the application.

In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 600 in FIG. 6 is shown with four client computing devices, any number of client computing devices may be supported. Other devices, such as devices with sensors, etc., may interact with server 612.

Communication network(s) 110 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server (e.g., servers 102) for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 600 may also include one or more databases 614 and 616, which may represent some or all of database 112 as discussed through the application. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands. However, databases 614 and 616 may provide relational databases, object-oriented databases, object-relational databases, NoSQL databases, etc., and may or may not be SQL-based. For example, databases 614 and/or 616 may be Oracle Database, PostgreSQL, Microsoft SQL Server, MySQL, MemSQL, Memcached, Redis, MongoDB, BigTable, Cassandra, DB2, Solr, etc.

Figure 7:
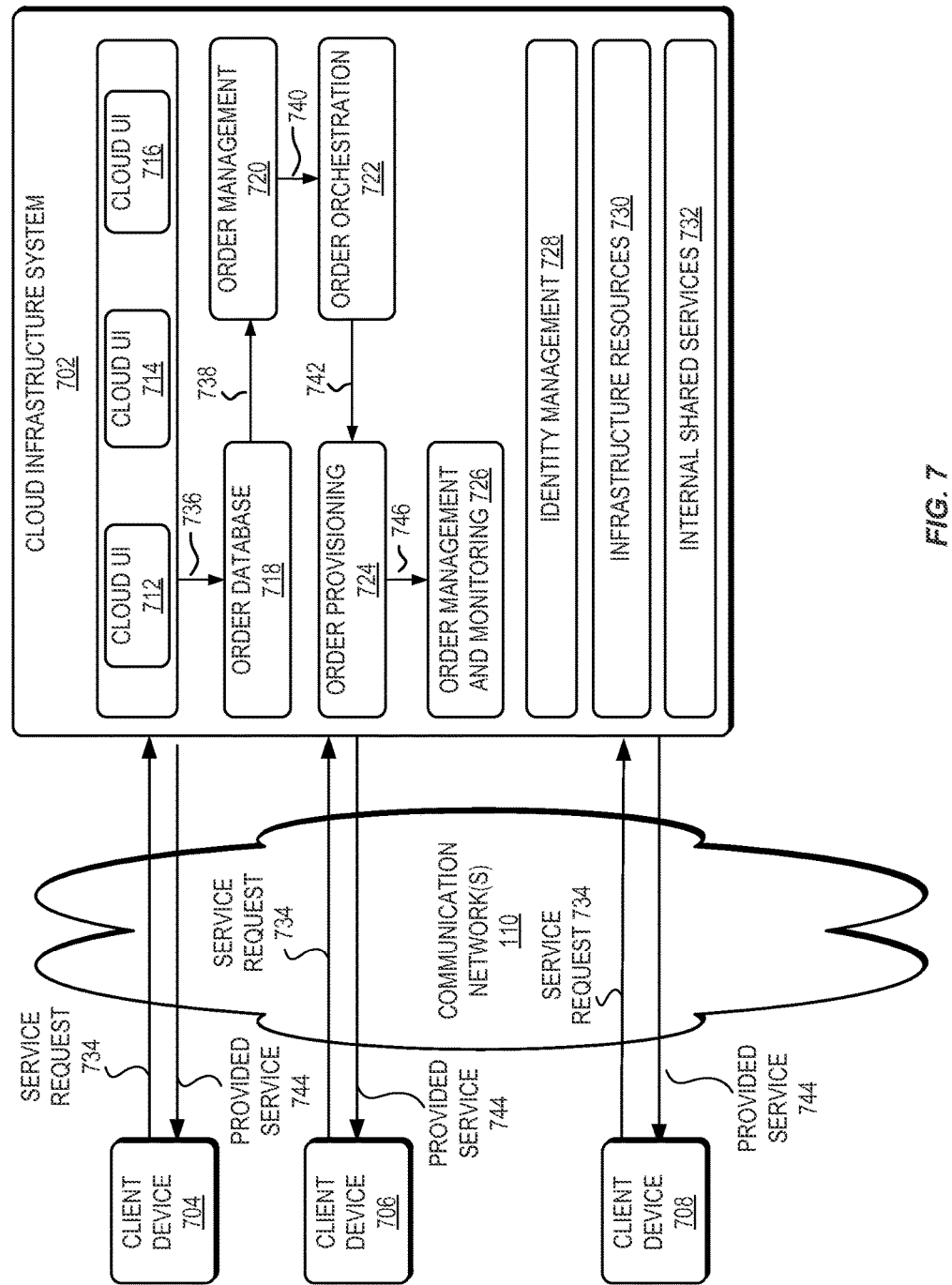
FIG. 7 is a simplified block diagram of one or more components of a system environment in which services may be offered as cloud services, in accordance with some embodiments of the present invention.

In some embodiments, code and/or data for providing automatic data translation may be offered as services via a cloud environment. FIG. 7 is a simplified block diagram of one or more components of a system environment 700 in which services may be offered as cloud services, in accordance with some embodiments of the present disclosure. In the illustrated embodiment in FIG. 7, system environment 700 includes one or more client computing devices 704, 706, and 708 that may be used by users to interact with a cloud infrastructure system 702 that provides cloud services. Additionally, in some embodiments the "client" computing devices 704, 706, 708 may actually be server computers (e.g., server computer 250A) acting as a client in a client-server relationship, where the server may provide automatic data translation and/or database services. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Communication network(s) 110 may facilitate communications and exchange of data between clients 704, 706, and 708 and cloud infrastructure system 702. Each network may be any type of network familiar to those skilled in the art that can support data communications using any of a variety of commercially-available protocols, including those described above for communication network(s) 110.

In certain embodiments, services provided by cloud infrastructure system 702 may include a host of services that are made available to users of the cloud infrastructure system on demand. In addition to services related to providing code and/or data for automatic data translation operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
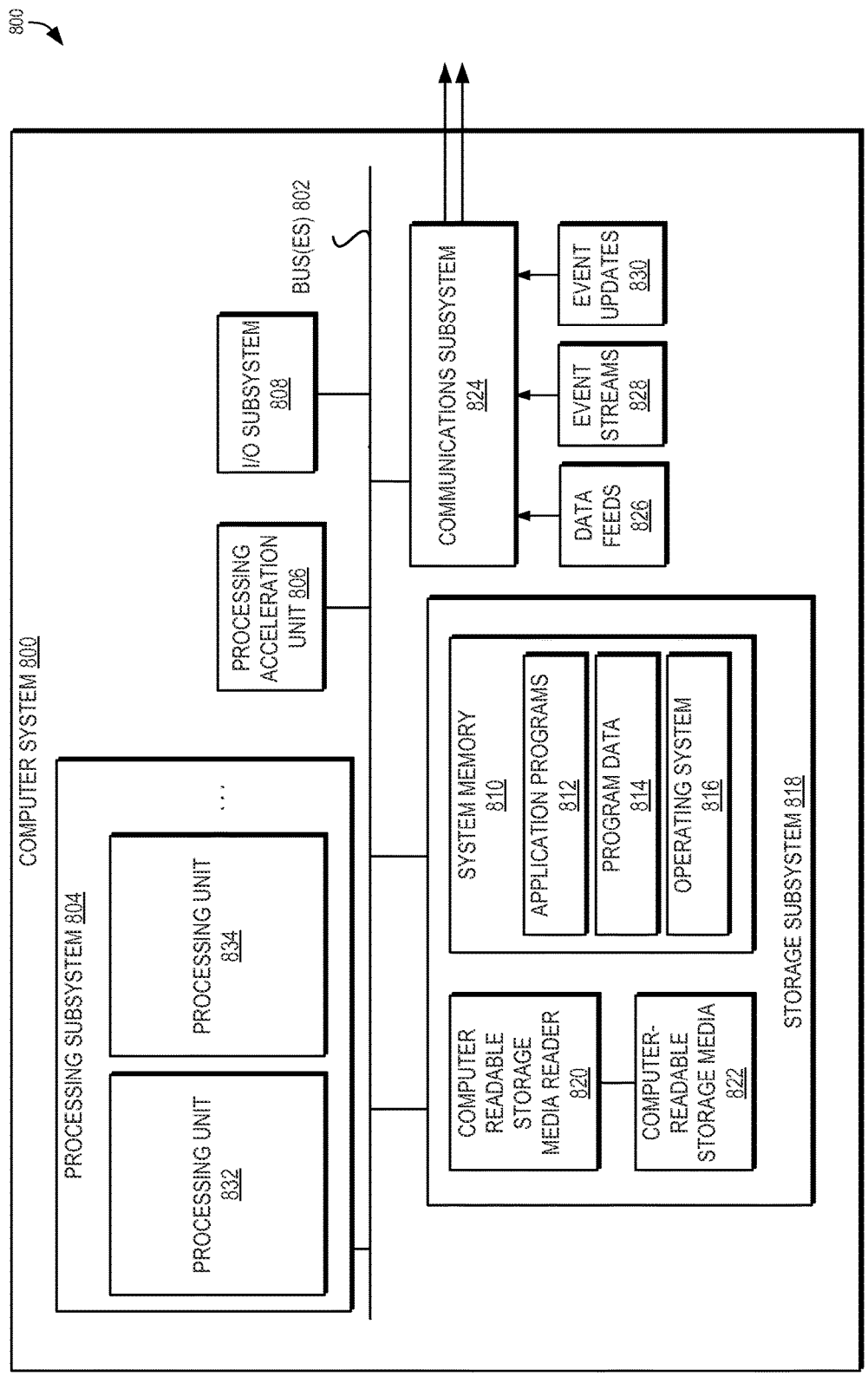
FIG. 8 illustrates an exemplary computer system that may be used to implement certain components according to some embodiments of the present invention.

FIG. 8 illustrates an exemplary computer system 800 that may be used to implement certain components according to some embodiments of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors (GPUs), digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for performing automatic data translation operations.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
   receiving, at a translation module executing at a server computer, a request from an application to execute a query against a database, wherein the request comprises a first data element of a first data type as part of the query;
   identifying, at the translation module, a binding between the first data element and an attribute of the database, wherein the binding associates the first data type of the first data element with a second data type of the attribute of the database;
   translating, by the translation module, the first data element from the first data type into a second data element of the second data type, wherein the first data element comprises a value represented in the first data type and the second data element comprises the value represented in the second data type;
   generating, by the translation module, the query using the second data element;
   sending, by the translation module, the query to a database server to be executed;
   receiving, by the translation module, a query response from the database server, the query response comprising a third data element of the second data type;
   translating, by the translation module, the third data element from the second data type into a fourth data element of the first data type; and
   transmitting, by the translation module, the fourth data element to the application in response to the request.

2. The method of claim 1, wherein the first data type is a string and the second data type is binary.

3. The method of claim 1, wherein the request to execute the query comprises a request to search for database records including the first data element.

4. The method of claim 1, wherein the third data element comprises
   portions of one or more database records stored by the database server that satisfy the query, and wherein the translating the third data element from the second data type into a fourth data element of the first data type comprises:
   automatically modifying, by the translation module, the portions of the one or more database records to replace one or more elements of the second data type with a corresponding one or more elements of the first data type to generate the fourth data element.

5. The method of claim 4, wherein:
   each of the one or more elements of the second data type comprises a string representation of a binary value that includes one or more non-alphanumeric characters; and
   the modifying the portions of the one or more database records comprises:
   translating, by the translation module, each of the one or more elements of the second data type from the string representation of the binary value to a pure binary value comprising one or more zero (0) values and one or more one (1) values; and
   translating, by the translation module, each of the pure binary values into a second string representation that includes a plurality of hexadecimal characters and a plurality of colon or period characters.

6. The method of claim 1, wherein:
   the first data element comprises a string representation of an Internet Protocol (IP) address including a plurality of hexadecimal characters and a plurality of colon or period characters; and
   the second data element comprises a string representation of a binary value of the IP address, wherein the second data element includes one or more non-alphanumeric characters.

7. The method of claim 1, wherein:
   the first data type is a string data type; and
   the second data type is also the string data type.

8. The method of claim 1, wherein the request to execute the query includes a pointer value that identifies the first data element.

9. The method of claim 1, wherein a size of the second data element is smaller than a size of the first data element.

10. The method of claim 9, wherein translating the first data element from the first data type into the second data element of the second data type comprises:
    executing a lossless data compression algorithm using the first data element to yield the second data element.

11. A non-transitory computer readable storage medium having instructions which, when executed by one or more processors, cause the one or more processors to perform operations comprising:
    receiving a request from an application to execute a query against a database, wherein the request comprises a first data element of a first data type as part of the query;
    in response to determining that the first data element of the first data type is bound with an attribute of the database having a second data type, automatically translating the first data element from the first data type into a second data element of the second data type, wherein the first data element comprises a value represented in the first data type and the second data element comprises the value represented in the second data type;
    generating the query using the second data element;
    sending the query to a database server to be executed;
    receiving a query response from the database server, the query response comprising a third data element of the second data type;
    translating the third data element from the second data type into a fourth data element of the first data type; and
    transmitting the fourth data element to the application in response to the request.

12. The non-transitory computer readable storage medium of claim 11, wherein the third data element comprises portions of one or more database records stored by the database server that satisfy the query, and wherein the translating the third data element from the second data type into a fourth data element of the first data type comprises:
  automatically modifying the portions of the one or more database records to replace one or more elements of the second data type with a corresponding one or more elements of the first data type to generate the fourth data element.

13. The non-transitory computer readable storage medium of claim 12, wherein:
  each of the one or more elements of the second data type comprises a string representation of a binary value that includes one or more non-alphanumeric characters; and
  the modifying the portions of the one or more database records comprises:
    translating each of the one or more elements of the second data type from the string representation of the binary value to a pure binary value comprising one or more zero (0) values and one or more one (1) values; and
    translating each of the pure binary values into a second string representation that includes a plurality of hexadecimal characters and a plurality of colon or period characters.

14. The non-transitory computer readable storage medium of claim 11, wherein:
  the first data element comprises a string representation of an Internet Protocol (IP) address including a plurality of hexadecimal characters and a plurality of colon or period characters; and
  the second data element comprises a string representation of a binary value of the IP address, wherein the second data element includes one or more non-alphanumeric characters.

15. A system, comprising:
  an application executing at a server computing device;
  one or more database servers; and
  a translation module communicatively coupled with the application and the one or more database servers, wherein the translation module:
    receives, from the application, requests to execute queries using the one or more database servers, wherein each of the requests comprise a data element of a first data type; and
    for each of the received requests:
      in response to determining that the data element of the first data type is bound with an attribute of a database having a second data type, automatically translates the data element from the first data type into a second data element of the second data type wherein the data element comprises a value in the first data type and the second data element comprises the value in the second data type;
      generates a query using the second data element;
      sends the query to at least one of the one or more database servers to be executed;
      receives a query response from the database server, the query response comprising a third data element of the second data type;
      translates the third data element from the second data type into a fourth data element of the first data type; and
      transmits the fourth data element to the application in response to the request.

16. The system of claim 15, wherein the third data element comprises
  portions of one or more database records stored by the database servers that satisfy the queries, and wherein the translating the third data element from the second data type into a fourth data element of the first data type comprises:
  modifies the portions of the one or more database records to replace one or more elements of the second data type with a corresponding one or more elements of the first data type to generate the fourth data element.

17. The system of claim 16, wherein:
  each of the one or more elements of the second data type comprises a string representation of a binary value that includes one or more non-alphanumeric characters; and
  the translation module modifies the portions of the one or more database records by:
    translating each of the one or more elements of the second data type from the string representation of the binary value to a pure binary value comprising one or more zero (0) values and one or more one (1) values; and
    translating each of the pure binary values into a second string representation that includes a plurality of hexadecimal characters and a plurality of colon or period characters.

18. The system of claim 16, wherein the translation module:
  for each of the received requests, translates the data element from the first data type into a second data element of a second data type by at least executing a lossless data compression algorithm using the data element to yield the second data element; and
  modifies the portions of the one or more database records to replace one or more elements of the second data type with a corresponding one or more elements of the first data type by at least decompressing the one or more elements of the second data type based upon the lossless data compression algorithm to yield the corresponding one or more elements of the first data type.

19. The system of claim 15, wherein, for at least one of the received requests:
  the data element comprises a string representation of an Internet Protocol (IP) address including a plurality of hexadecimal characters and a plurality of colon or period characters; and
  the second data element comprises a string representation of a binary value of the IP address, wherein the second data element includes one or more non-alphanumeric characters.

20. A method, comprising:
  receiving, at a translation module executing at a server computer, a request from an application to execute a query against a database, wherein the request identifies a first data element of a string data type storing a textual representation of an Internet Protocol (IP) address, wherein the textual representation comprises one or more alphanumeric characters and one or more colon or period characters;
  translating, by the translation module, the first data element from the string data type into a second data element of a binary data type storing a binary value of the IP address, wherein the binary value comprises one or more zero (0) values and one or more one (1) values;
  translating, by the translation module, the second data element of the binary data type into a third data element of the string data type storing a string representation of the binary value of the IP address, wherein the string representation includes one or more non-alphanumeric characters;

generating, by the translation module, the query using the third data element; and sending, by the translation module, the query to a database server to be executed;

receiving, by the translation module, a query response from the database server, the query response comprising a fourth data element of the string data type;

translating, by the translation module, the fourth data element from the string data type into a fifth data element of the binary data type;

translating, by the translation module, the fifth data element of the binary data type to a sixth data element of the string data type; and transmitting, by the translation module, the sixth data element to the application in response to the request.

* * * * *